United States Patent
Walter et al.

(10) Patent No.: US 6,585,613 B1
(45) Date of Patent: Jul. 1, 2003

(54) INFINITELY VARIABLE TRANSMISSION WITH A LOCKING DEVICE

(75) Inventors: Bernhard Walter, Oberkirch (DE); Kurt Graef, Puhlheim (DE); Rainer Eidloth, Bamberg (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/715,421

(22) Filed: Nov. 17, 2000

Related U.S. Application Data

(62) Division of application No. 09/216,074, filed on Dec. 18, 1998, now Pat. No. 6,174,253.

(30) Foreign Application Priority Data

Dec. 22, 1997  (DE) .......................... 197 57 175

(51) Int. Cl.[7] .................. F16H 55/56; F16G 59/00; F16G 63/00
(52) U.S. Cl. ............................. 474/8; 474/70
(58) Field of Search ............... 474/18, 28, 8, 474/13, 31, 30, 43, 70, 38, 52–55

(56) References Cited

U.S. PATENT DOCUMENTS

| | | | | |
|---|---|---|---|---|
| 815,345 A | * | 3/1906 | Gullowsen | 474/53 |
| 3,572,145 A | * | 3/1971 | Sporck | 474/30 |
| 4,380,444 A | * | 4/1983 | Dolza | 474/30 X |
| 4,481,004 A | * | 11/1984 | Abbott | 474/28 |
| 5,649,457 A | | 7/1997 | Kudou et al. | |

FOREIGN PATENT DOCUMENTS

DE   195 44 644   6/1998

* cited by examiner

Primary Examiner—David A. Bucci
Assistant Examiner—Marcus Charles
(74) Attorney, Agent, or Firm—Darby & Darby P.C.

(57) ABSTRACT

An infinitely variable transmission has a pair of driving conical flanges arranged on a first shaft and a pair of driven conical flanges arranged on a second shaft. Each pair has one axially movable conical flange and one axially fixed conical flange. The transmission is equipped with a locking device which when necessary can frictionally lock at least one driving conical flange to a driven conical flange.

13 Claims, 6 Drawing Sheets

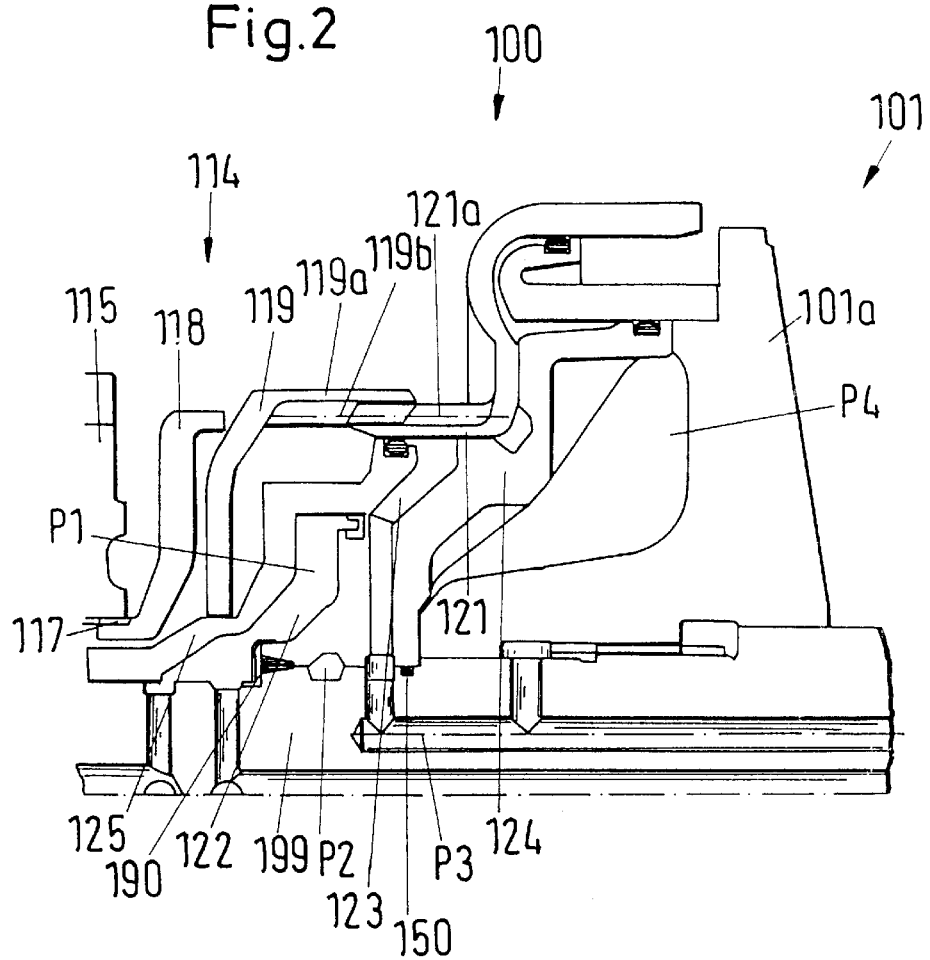
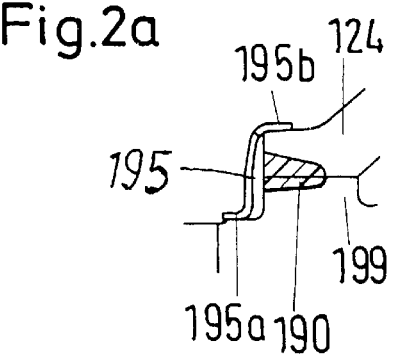

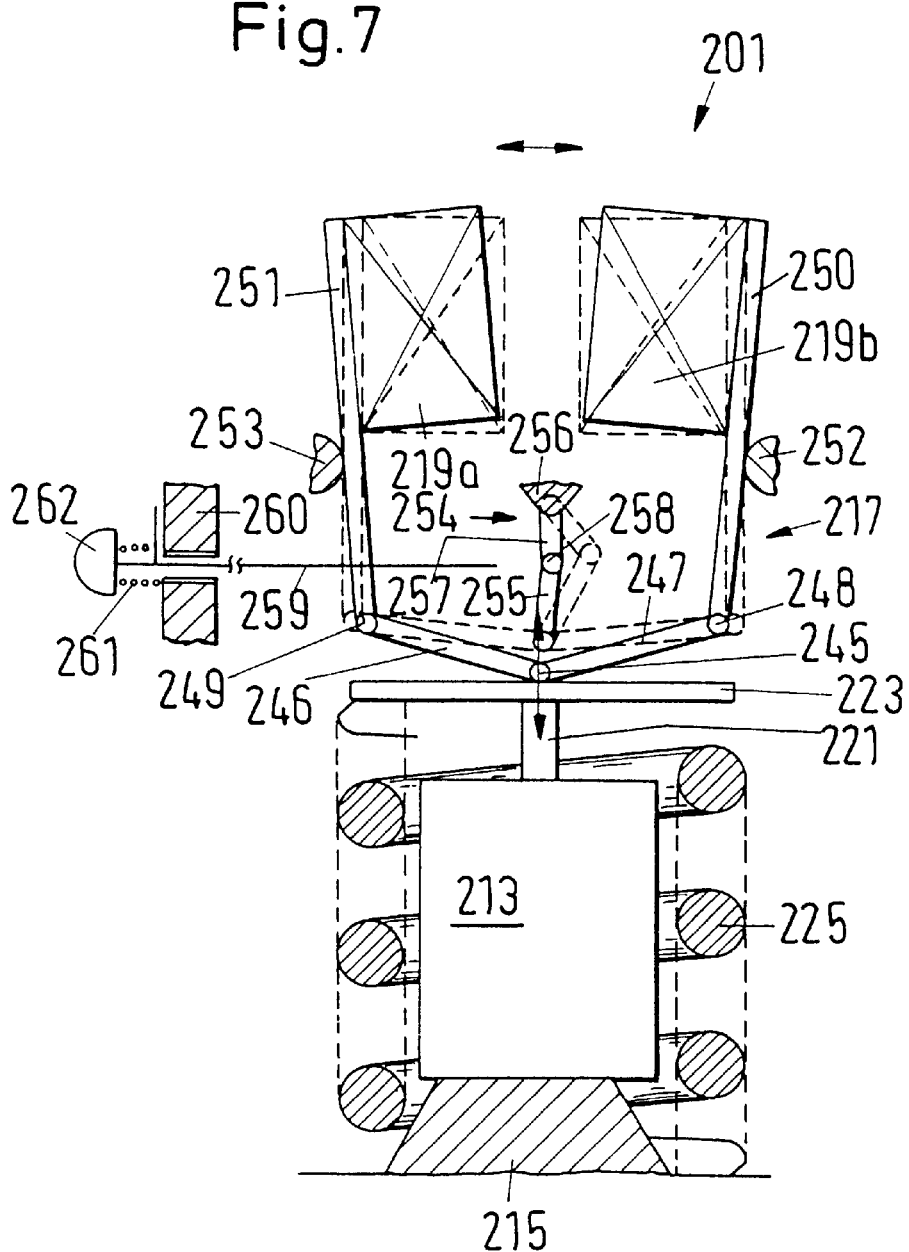

INFINITELY VARIABLE TRANSMISSION WITH A LOCKING DEVICE

"This is a division, of application Ser. No. 09/216,074, filed Dec. 18, 1998 now U.S. Pat. No. 6,174,253. Each of these prior applications is hereby incorporated herein by reference, in its entirety."

BACKGROUND OF THE INVENTION

The invention relates to a transmission, such as an infinitely variable transmission with wrapped-around conical flanges, with a first pair of conical flanges and a second pair of conical flanges each having an axially movable and an axially fixed flange, and-with a torque transmitting wrapping means disposed between such pairs of conical flanges.

Such transmissions became known, for example, from the published German patent application 195 44 644.

Furthermore, in accordance with the state of art, for example in U.S. Pat. No. 5,649,457, it is known to provide such transmissions with a parking lock wherein a manually operable pawl acts upon a gear which is non-rotatably secured to the shaft of the set of driven flanges. Such arrangement necessitates additional axial installation room on the driven shaft and is expensive.

OBJECTS OF THE INVENTION

An object of the present invention is to simplify the construction and the assembly of transmissions of the aforedescribed character and to improve their mode of operation.

In accordance with the invention, this is accomplished in transmissions wherein essentially circular ring-shaped elements form piston/cylinder units and plenum chambers for the application of pressure and/or for axial displacement of the axially movable conical flanges in such a way that at least some ring-shaped elements are connected with a shaft by means of a welded seam.

It might be advisable that the welded seam be provided for the transmission of torque and/or for the prevention of turning.

It is equally of advantage if the welded seam is provided to secure a circular ring-shaped element against axial movement on a shaft.

Furthermore, it is advisable if the welded seam is provided to secure a circular ring-shaped element against axial movement relative to a further ring-shaped element.

In accordance with a further embodiment, it is advisable that the radially inner portions of the circular ring-shaped elements be provided with openings for reception of the shaft and that the welded seam connect the radially inner portions of the circular ring-shaped elements with the shaft.

Furthermore, that object of the invention which involves improving the mode of operation of a transmission of the aforedescribed character is accomplished in that, in order to prevent a rolling away of a motor vehicle which is equipped with the transmission, the latter is provided with a locking device which, when necessary, frictionally locks at least one driving conical flange to a driven conical flange, namely furnishes a means for simultaneous engagement with both conical flanges so that the two conical flanges can no longer turn relative to each other because of the frictional engagement whereby the driven wheels, which are disposed at the end of the power train, can no longer turn relative to each other and, consequently, the vehicle is prevented from rolling away. In such arrangement, no further axial space on the driven shaft is necessary. This renders it possible to dispense with the utilization of an additional toothed gear.

In this connection, it is of great advantage to establish a frictional engagement at the outer peripheries of both conical flanges and to insert a wedge in the gap which develops between the conical flanges in a circumferential direction to thus block the two conical flanges against movement relative to each other. The locking device can be arranged in such a way that a wedge is inserted into the gap from both sides or only from one side. The wedge can be cuneiform or it can conform to the radii of the conical flanges. The material of the wedge can constitute a material with a high friction coefficient, for example, a material for the making of friction linings in clutches of brake linings, or a synthetic plastic material which, if necessary, is reinforced with fibrous filamentary material.

In accordance with the invention, the locking device comprises an actuator which actuates the wedge or wedges, which is preferably provided in the case of the transmission, and which can constitute, for example, an electric motor, a servo cylinder of a hydraulic or pneumatic pressure supplying arrangement, a prestressed spring or a cable winch which latter can be operated mechanically or electrically. In accordance with an inventive concept, an actuator can act upon a wedge or, if two wedges are utilized, an actuator with a suitably designed mechanism can act upon both wedges or a discrete actuator can act upon each of the wedges. An advantage of the utilization of an electrical actuator is that it is not necessary to introduce mechanical or pressurized fluid-conveying lines into the passenger compartment.

Furthermore, it can be of advantage to operate the actuator—such as a motor, also that of the cable winch or a slave cylinder—during introduction of the wedge or wedges counter to the opposition of an axially compressible energy storing device, for example, a helical-, diaphragm- or coil spring, and to thereupon lock the energy storing device so that, in response to a disengagement, the locking device can be deactivated without it being necessary to employ the actuator. This renders it possible to set up an emergency unlocking function which can release the energy storing device, either mechanically or pyrolytically, so that a disengagement of the locking devices, for example in the event of a malfunctioning of the on-board network or the pressure supplying arrangement, can take place. In the event of a network malfunction, an additionally provided source of electrical energy, such as an accumulator or a battery, can be used to supply energy to an electrically operated actuator. For example, the means for releasing a prestressed energy storing device can consist of or comprise a manually operable cable which can withdraw a bolt of the like from the range of the energy storing device, or a pyrolytic unit which serves the same purpose.

Since at least one conical flange of those conical flanges which are to be locked is movable in the axial direction, and in order to avoid the development of tilting moments of wedges in response to axial displacement of the conical flanges, it is of advantage to provide the outer periphery of at least one conical flange with a circumferential collar which extends in the axial direction to thus ensure that those surfaces of the wedges which abut the conical flanges are disposed at the same level as seen in the axial direction. At the same time, such collar can constitute a constituent of the pressure applying arrangement for the axially movable conical flange and can constitute at least a portion of or a cylinder housing which guides a piston serving as a means for axially stressing the conical flange.

The means for controlling a locking device which is operated by an electrical actuator can include an electric switch which is preferably installed in the passenger compartment so that one can dispense with expensive conductors and mechanical motion transmitting devices.

BRIEF DESCRIPTION OF THE DRAWINGS

The invention will be described in greater detail, by way of example, with reference to the embodiments which are illustrated in FIGS. 1 to 7. There are shown in.

DETAILED DESCRIPTION OF THE PREFERRED EMBODIMENT

Figure 1:
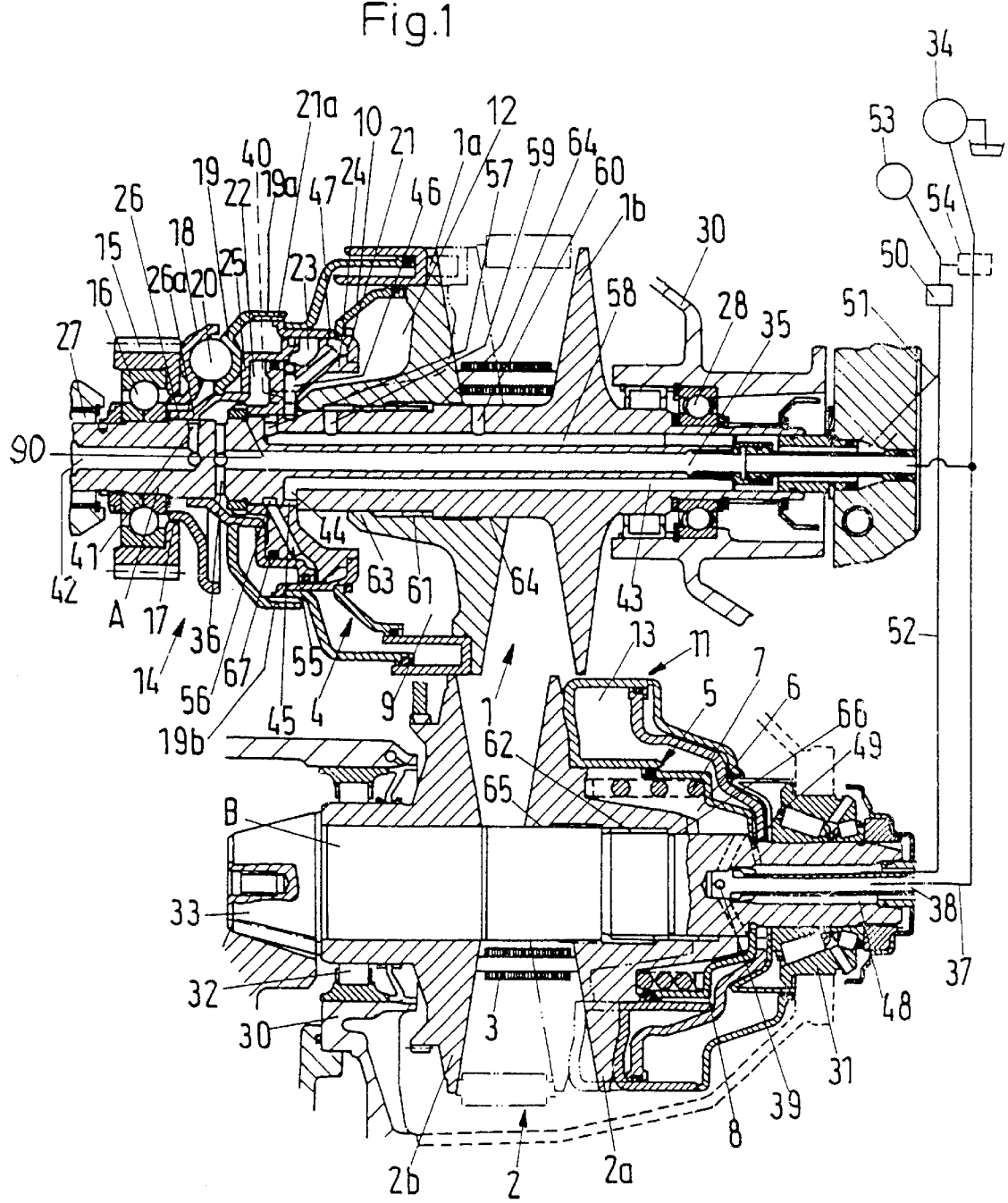
FIG. 1 a sectional view of a partially illustrated transmission, such as an infinitely variable transmission with wrapped-around conical flanges, FIG. 2 a portion of a pair of conical flanges in a sectional view, FIG. 2a a detail in FIG. 2, FIG. 3 a portion of a pair of conical flanges in a sectional view, FIG. 4 a portion of a pair of conical flanges in a sectional view, FIG. 5 a portion of a pair of conical flanges in a sectional view, FIG. 6 a sectional view of a partially illustrated transmission with a schematically represented locking device, and FIG. 7 a schematic elevational view of an embodiment of a locking device.

That embodiment of an infinitely variable transmission with wrapped-around conical flanges a portion of which is illustrated in FIG. 1 comprises a pair of input discs, shown in the form of a pair 1 of conical flanges non-rotatably mounted on a driver shaft A, and a pair of discs, such as a pair 2 of conical flanges, non-rotatably mounted on the driven shaft B. Each pair of discs comprises an axially displaceable, such as movable, disc-shaped member, such as a conical flange, 1a and 2a as well as an axially fixed disc-shaped member, such as a conical flange, 1b and 2b. A wrapping means, for example in the form of a chain 3 or a belt, is provided between the two pairs of discs for the purposes of torque transmission.

The upper halves of illustrations of each of the respective pairs 1, 2 of discs show those relative axial positions of the cooperating discs 1a, 1b and 2a, 2b which correspond to the maximum ratio of the transmission to lower speed (underdrive), whereas the lower halves of the illustrations depict those positions of the respective cooperating discs 1a, 1b and 2a, 2b which correspond to the maximum ratio of the transmission to higher speed (overdrive).

The pair 1 of discs can be axially stressed by an adjusting means 4 shown in the form of a piston-cylinder unit. In a similar fashion, the pair 2 of conical flanges can be axially stressed against the chain 3 by an adjusting means 5 which also constitutes a piston/cylinder unit. In the plenum chamber 6 of the piston/cylinder unit 5, there is provided an energy storing device 7 constituted by a coil spring which urges the axially movable disc component 2a in a direction toward the axially fixed disc component 2b. When, at the output side, the chain 3 is located in the radially inner region of the pair 2 of discs, the clamping force furnished by the energy storing device 7 is greater than when the chain 3 is located in the region of the larger diameter of the pair 2 of discs. Thus, this denotes that, as the ratio of the transmission increases toward a higher ratio to a higher speed, the initial stressing force furnished by the energy storing device 7 increases. On the one hand, the coil spring bears directly upon the axially movable disc portion 2a and, on the other hand, bears upon a cupped component part 8 which bounds the plenum chamber 6 and is rigidly connected to the driven shaft B. Connected to operate in parallel with the piston/cylinder units 4, 5, there are respectively provided additional piston-cylinder units 10, 11 which serve to change the ratio of the transmission. Depending on the required transmission ratio, the plenum chambers 12, 13 of the piston/cylinder units 10, 11 can be alternatively filled with and relieved of pressurized fluid. To this end, and depending upon the requirements, the plenum chambers 12, 13 can be connected with a source of pressurized fluid, such as a pump, or with an outlet conduit. Thus, if the transmission ratio is to be changed, one of the plenum chambers 12, 13 is filled with pressurized fluid. i.e., the volume of such chamber is increased, while the other plenum chamber 13, 12 is at least partially emptied, i.e., its capacity is reduced. Such alternative pressurization and emptying of the plenum chambers 12, 13 can be effected by way of a suitable valve. As concerns the design and the mode of operation of such valve, reference may be had in particular to the already described state of art. For example, the published German patent application 40 36 683 discloses a valve 36 which constitutes a square-head cock and is supplied by a source 14 of pressurized fluid in the form of a pump.

For the generation of an at least torque-dependent pressure, there is provided a torque sensor 14 the operation of which is based upon a hydromechanical principle. The torque sensor 14 transmits to the pair 1 of conical flanges that torque which is supplied by a driver gear or driver pinion 15. The driver gear 15 is mounted on the driving shaft A by way of a roller bearing 16 and is non-rotatably connected with a cam disc 18, which forms part of the torque sensor 14 and is also axially supported by the driver gear, by way of a form-locking connection such as the teeth 17. The torque sensor 14 comprises the axially fixed cam disc 18 and an axially shiftable cam disc 19; these cam discs have ramps separated by spreading elements in the form of spheres 20. The cam disc 19 is movable axially of but cannot rotate relative to the driver shaft A. To this end, the cam disc 19 comprises a radially outer portion 19a which extends axially and away from the spheres 20 and carries teeth. 19b cooperating with complementary teeth 21a of a component part 21 which is fixedly secured to the driving shaft A not only axially but also in the circumferential direction. The component parts of the torque sensor 14 define two plenum chambers 22, 23. The plenum chamber 22 is bounded by an annular component part 24 which is rigidly affixed to the driver shaft A as well as by the sections or component parts 25, 26 which are formed or carried by the cam disc 19. The ring-shaped component part 24 is connected to the shaft A, i.e., to the driver shaft, by way of a welded connection. The welded seam 90 of the welded connection can constitute an annular welded seam which not only non-rotatably connects the component part 24 to the shaft A but also supports the part 24 in the axial direction. The annular plenum chamber 23 is located practically radially outwardly of the annular plenum chamber 22 but is axially offset relative thereto. The second plenum chamber 23 is also bounded by the annular component part 24 as well as by a sleeve-like component part 21 which is fixedly connected to the part 24, and the chamber 23 is further bounded by a ring-shaped component part 25 which is fixedly secured to the cam disc 19 and is movable axially to act as a piston.

The input or driving shaft A which carries the torque sensor 14 and the pair 1 of conical flanges is journalled in a housing 30 by way of a needle bearing 27 at the side of the torque sensor and, at that side of the pair 1 of conical flanges which faces away from the torque sensor 14, by way of a ball bearing 28 which can take up axial force and by a roller bearing which is designed to take up radial stresses. The driven or output shaft B which carries the pair 2 of driven discs has an end which is adjacent the adjusting members 5 and 11 and is journalled in the housing 30 by way of a twin conical roller bearing 31 which can take up radial forces as well as axial forces acting in axial directions. That end portion of the shaft B which is located at the side of the pair 2 of discs facing away from the adjusting members 5, 11 is journalled in the housing 30 by a roller bearing 32. That end of the driven shaft B which faces away from the said adjusting members 5, 11 carries a bevel gear 33 which can be operatively connected, for example, with a differential.

In order to generate that pressure which is modulated by the torque sensor 14 at least as a function of torque and is required for tensioning of the infinitely variable transmission with wrapped-around conical flanges, there is provided a pump 34 which is connected with the plenum chamber 22 of the torque sensor 14 by way of a central channel 35 provided in the driver shaft A and communicating with at least one radial channel 36. The pump 34 is further connected, by a connecting conduit 37, with the plenum chamber 6 of the piston/cylinder unit 5 at the second pair 2 of discs. The connecting conduit 37 communicates with a central channel 38 which is provided in the driven shaft B, and the channel 38 is connected with the plenum chamber 6 by way of at least one radially extending channel 39.

The plenum chamber 22 of the torque sensor 14 is connected with the plenum chamber 9 of the piston/cylinder unit 4 by way of a channel 40 which is circumferentially offset relative to the plane of FIG. 1 and, therefore, is indicated by broken lines. The channel 40 is provided in the ring-shaped component part 24 which is connected to the shaft A by the welded seam 90. Thus, the channel 40 establishes a permanent connection between the first plenum chamber 22 and the plenum chamber 9. The driver shaft A is further provided with at least one evacuating or discharging channel 41 which communicates or can be caused to communicate with the plenum chamber 22 and the effective cross-sectional area of which can be varied at least as a function of the transmitted torque. The evacuating channel 41 discharges into a central bore 42 of the shaft A which bore, in turn, can be communicatively connected with a conduit by way of which oil being discharged from the torque sensor 14 can be supplied to a corresponding location, e.g., for lubrication of component parts. The axially movable ramp or cam section 19, which is axially movably mounted on the driver shaft A, cooperates with the inner region 26a to form a closing or locking zone which cooperates with the evacuating channel 41 to seal the evacuating channel 41 to a greater or lesser extent in dependency at least upon the then prevailing torque. Thus, the closing or sealing region 26a and the evacuating channel 41 together constitute a valve or throttling zone. The outlet opening, i.e., the evacuating channel 41, is opened or closed in dependency at least upon the magnitude of torque being transmitted between the two discs 18, 19. The extent of closing or opening of the evacuating channel 41 depends upon the position of the disc 19 which acts as a control piston or regulating piston, and the fluid pressure at least in the plenum chamber 22 is dependent upon the then transmitted torque. The means for pressurizing the fluid is the pump 34. A corresponding fluid pressure is established also in the plenum chambers 9 and 6 because the plenum chamber 22 communicates with the plenum chamber 9 and, by way of the conduits or channels 35, 36, 37, 38 and 39, also with the chamber 6.

Due to the fact that the piston/cylinder units 4, 5 are connected in parallel with the piston/cylinder units 10, 11, the forces generated by pressure furnished by the torque sensor 14 and acting upon the axially movable discs or flanges 1a, 2a are added to those forces which act upon the discs 1a, 2a due to the pressure prevailing in the chambers 12, 13 for the purpose of selecting the ratio of the transmission.

The plenum chamber 12 is supplied with pressurized fluid by way of a channel 43 which is provided in the shaft A and communicates with an annular groove 45 of the shaft A by way of a radial bore 44. The annular groove 45 communicates with at least one channel 46 which is provided in the ring-shaped component part 24 and serves to establish communication with a radial passage 47 provided in the sleeve-like component part 21 and communicating with the plenum chamber 12. The plenum chamber 13 receives oil in a similar fashion, namely by way of a channel 48 which surrounds the channel 38 and communicates with the plenum chamber 13 via radially extending connecting channels 49. The channels 43 and 48 receive pressurized fluid from a common source with the interposition of at least one valve 50 and connecting conduits 51, 52. The source 53 of pressurized fluid which communicates with the valve or valve system 50 can constitute a discrete pump or the already available pump 34; in the latter instance, it is necessary to provide a suitable volume- and pressure regulating system 54 which can comprise several valves. Such alternative solution is indicated by broken lines.

When the individual component parts assume relative positions corresponding to those of the pair 1 of conical flanges shown in the upper half of the FIG. 1, the plenum chamber 23 operates in parallel with the plenum chamber 22 when these plenum chambers contain pressurized fluid. At such time, the plenum chamber 23 is sealed from the source of pressurized fluid because the bores or channels 55, 56, 57, 58, 59, 60 which communicate with the plenum chamber 23 are then sealed from a source of pressurized fluid such as especially the pump 34. Due to the then position of the axially displaceable disc 1a, the radial bore 60 is then fully exposed so that the pressure in the chamber 23 is fully relieved at such time. The axial force-then being transmitted from the torque sensor to the cams resp. to the conical flange 19 in dependency upon the magnitude of the then transmitted torque is taken up solely by a cushion of pressure being built up in the plenum chamber 22. At such time, the magnitude of pressure being built up in the plenum chamber 22 increases with increasing torque which is to be transmitted. As already mentioned hereinbefore, such pressure is being regulated by the regions 26a and evacuating bore 41 which together act as a throttle valve.

The conical flange 1a is displaced in a direction to the right, toward the conical flange 1b, if the transmission ratio is to be changed to a higher speed.

The result at the pair 2 of conical discs is that the conical flange 2a moves away from the axially fixed conical flange 2b. As already mentioned hereinbefore, the upper halves of illustrations of the pairs 1, 2 of conical flanges denote the relative positions of the flanges 1a, 1b and 2a, 2b corresponding to extreme positions for a change of transmission ratio to a lower speed whereas, on the other hand, the lower halves of such illustrations denote those relative positions of the flanges 1a, 1b and 2a, 2b which correspond to the other extreme positions of the flanges 1a, 1b and 2a, 2b being assumed for a change of transmission ratio to the higher speed.

In order to shift from the transmission ratio shown in the upper halves of the illustrations of the pairs 1, 2 of conical flanges to the transmission ratio shown in the lower halves, a corresponding manipulation of the valve 50 entails an appropriate filling of the plenum chamber 12 and a corresponding evacuation, i.e., a corresponding reduction of the volume, of the plenum chamber 13.

The axially shiftable conical flanges 1a, 2a are non-rotatably coupled to the associated shafts A and B by way of toothed connectors 61, 62, respectively. The rotation preventing connectors 61, 62 are established by internal teeth of the flanges 1a,2a and by external teeth on the respective shafts A and B, and such connectors render possible an axial displacement of the flanges 1a, 2a along the respective shafts A, B.

That position of the axially movable flange 1a which is shown by dot-dash lines in the upper half of the illustration of the driving pair 1 of flanges and the respective position of the chain 3 correspond to the highest possible ratio of the transmission to a higher speed. The dot-dash line position of the chain 3 around the set 1 of flanges corresponds to the solid-line position of that portion of the chain 3 which is trained over the set 2 of flanges.

The dot-dash position of the axially shiftable conical flange 2a shown in the lower half of representation of the driven pair 2 of flanges and the respective position of the chain 3 correspond to the maximum shift of the transmission to a lower speed ratio. Such position of the chain 3 corresponds to the solid-line position of the chain assumed by the latter when the flanges of the pair 1 assume the positions shown in the upper half of the Figure.

In the illustrated embodiment, the flanges 1a, 2a comprise radially inner centering portions 63, 64 or 65, 66 by means of which they are directly mounted on and centered by the respective shafts A and B. The guide portions 63, 64 of the axially shiftable flange 1a are received on the peripheral surface of the shaft A practically without play and cooperate with the channels 59, 60 to constitute valves wherein the flange 1a can be said to constitute a slidable valve member for the channels 59, 60. When the flange 1a is shifted from the position shown in the upper half of illustration of the set 1 of flanges in a direction to the right, the channel 60 is gradually sealed by the guide portion 64 after the flange 1a has completed a certain axial movement in a direction to the right. This is due to the fact that the guide portion 64 assumes a position radially outwardly of the channel 60. In such axial position of the flange 1a, the radially outer end of the channel 59 is also sealed, namely by the guide portion 63 of the flange 1a. As the flange 1a continues to move axially toward the flange 1b, the channel 60 remains sealed but the flange 1a, and more specifically its regulating or guide portion 63, gradually exposes the channel 59. Consequently, the channel 59 establishes a path for the flow of fluid between the plenum chamber 9 of the cylinder/piston unit 4 and the channel 58 which, in turn, establishes a path to the plenum chamber 23 by way of the channels 57, 56 and 55. Since the channel 60 is practically sealed, and since the plenum chamber 9 communicates with the two plenum chambers 22 and 23, a practically identical pressure prevails in the plenum chambers 22, 23 and in the plenum chamber 9 and hence also in the plenum chamber 6 which is operatively connected with the plenum chambers 9, 22 and 23 by way of the channel 35 and conduits 37, 38, provided that one disregards minor losses which are attributable to the flow of fluid along the aforedescribed paths. Owing to the transmission ratio-dependent connection between the plenum chambers 22 and 23, the axially effective area of the cushion of pressure medium existing in the torque sensor 14 is increased, namely because the effects of the axially effective surfaces in the two plenum chambers 22, 23 are superimposed upon, i.e., added to, each other. Such increase of the axially effective supporting surface brings about that, with reference to the same torque, the pressure being built up by the torque sensor is reduced practically proportionally with the increase of the area which, in turn, means that the fluid pressure in the plenum chambers 9 and 6 is also reduced accordingly. Thus, the novel torque sensor 14 renders it possible to establish a transmission ratio-dependent modulation of pressure which is superimposed upon the RPM-dependent modulation of pressure. Thus, the illustrated torque sensor 14 actually permits for a two-stage modulation of pressure resp. the pressure level.

In the illustrated embodiment, the two channels 59, 60 are arranged and designed, relative to each other and relative to the cooperating regions 63, 64 of the flange 1a, in such a way that a shifting from one plenum chamber 22 to two plenum chambers 22 and 23 or vice versa takes place at a transmission ratio of 1:1 of the conical flange transmission. However, and as already indicated hereinbefore, and for reasons attributable to structure, such shifting from one plenum chamber to two plenum chambers or vice versa cannot take place abruptly; therefore, there is provided a transition zone in which the evacuating channel 60 is already sealed but the connecting channel 59 is yet to establish communication with the plenum chamber 9. In order to ensure adequate functioning of the transmission resp. the torque sensor 14 during such transition stage, which necessitates that the cam disc 19 be free to move axially, there are provided compensating means which permit for a volumetric increase of the plenum chamber 23 so that the torque sensor 14 can carry out a pumping action, namely that the cylinder parts and the piston parts of the torque sensor 14 can move axially relative to each other. In the illustrated embodiment, such compensating means are established by a tongue- or lip seal 67 which is received in a radial groove of the ring-shaped component part 24 and cooperates with the cylindrical internal surface of the component part 25 to seal the plenum chambers 22, 23 from each other. The sealing ring 67 is designed and installed in such a way that it seals only in one axial direction, i.e., it prevents an equalization of pressures between the chambers 22 and 23 in only one direction while permitting, at least in response to the establishment of a positive pressure differential between the plenum chamber 23 and the plenum chamber 22, an equalization of pressures resp. a flow through the sealing ring 67. Thus, the sealing ring 67 acts not unlike a check valve which prevents a flow from the plenum chamber 22 into the plenum chamber 23 but permits a flow through the sealing arrangement established by the sealing ring 67 when the pressure in the plenum chamber 23 exceeds the pressure in the plenum chamber 22 to a certain extent. Thus, in response to a movement of the cam disc 19 in a direction to the right, pressurized fluid can flow from the closed plenum chamber 23 into the plenum chamber 22. In response to a next-following movement of the cam disc 19 in a direction to the left, a subatmospheric pressure can develop in the plenum chamber 23 and it can even happen that air bubbles develop in the supply of oil therein. However, this does not adversely affect the operation of the torque sensor resp. of the conical flange transmission.

In lieu of the seal 67 which acts as a check valve, it would also be possible to employ a check valve which would be effective between the plenum chambers 22, 23 and would be installed in the ring-shaped structural member 24. It would then be possible to employ a seal 67 which would be effective in both axial directions. Furthermore, it would also be possible to install this check valve in such a way that it would be effective between the two channels 35 and 58. In such case, the check valve must be arranged in such a way that a volumetric flow in possible from the plenum chamber 23 in a direction toward the plenum chamber 22 but the check valve would seal in the opposite direction.

The preceding description of the mode of operation reveals that, practically within the entire partial range of the transmission range in which the transmission shifts to a lower speed (underdrive), the axial force being generated for the spheres at the ramps of the discs 18, 19 is taken up solely by the axially effective surface established by the plenum chamber 22 whereas the axial force which is generated at the ramps for the spheres acting upon the disc 19 practically within the entire partial range of the transmission ratio range when the transmission shifts to a higher speed (overdrive) is taken up by the effective surfaces of both plenum chambers 22, 23. Thus, and referring to an unchanging input torque, when the transmission shifts to a lower speed ratio, the pressure generated by the torque sensor is higher than that generated by the torque sensor when the transmission shifts to a higher speed ratio. As already mentioned above, the illustrated transmission is set up in such a way that the switchover point which effects the establishment of a connection between or a separation of the two plenum chambers 22, 23 is in the range of a transmission ratio of 1:1. However, by resorting to a corresponding arrangement and shape of the channels 59, 60 and of those regions 63, 64 of the conical flange 1a which cooperate with these channels, it is possible to shift the switchover point resp. the switchover range to a desired location within the entire range of ratios of the conical-flange transmission.

It is also possible to establish a connection between or to separate the two plenum chambers 22, 23 from each other by a special valve which is provided for such purpose and can be installed in the region of a channel connecting the plenum chambers 22, 23 to each other; furthermore, such valve need not be actuatable directly by the flange 1a or 2a but can, for example, be actuatable by an external energy source. To this end, one can employ for example an electromagnetically, hydraulically or pneumatically actuatable valve which is shiftable in dependency upon the transmission ratio or a change of the ratio of the transmission. For example, one can employ a so-called 3/2 valve which establishes a connection between or a sealing of the plenum chambers 22, 23 from each other. However, it is equally possible to employ a pressure or head valve. A suitable valve could be provided in the region of a conduit connecting the channels 35 and 58 with each other; in such instance, the channels 59 and 60 are sealed or omitted. The corresponding valve is switched or connected or installed in such a way that, when the plenum chambers 22, 23 are sealed from each other, the pressure in the plenum chamber 23 is relieved by way of the valve. To this end, the valve can be connected with a conduit leading back to the oil sump.

In the event of utilization of a valve which can be controlled from the outside, such valve can also be actuated in dependency upon additional parameters. For example, such valve can also be actuated in dependency upon surges of torque which develop in actual use. In this manner, one can for example avoid or at least reduce a slipping of the chain at least under certain operational circumstances or within certain ratio ranges of the conical flange transmission.

In the structure which is shown in FIG. 1, the torque sensor 14 is installed at the input side and adjacent the axially shiftable conical flange 1a. However, the torque sensor 14 can be installed and appropriately adapted at any desired location in the power flow. Thus, and as known per se, the torque sensor 14 can be installed at the output side, for example, on the driven shaft B. Such a torque sensor can—in a manner similar to that for the torque sensor 14—be adjacent the axially movable conical flange 2a. It is also possible, and as already known per se, to employ several torque sensors. For example, suitable torque sensors can be provided at the driving side and at the output side.

Furthermore, the novel torque sensor 14 having at least two plenum chambers 22, 23 can be combined with other known per se undertakings for torque-dependent and/or transmission ratio-dependent pressure modulation. Thus, and as described for example in the published German patent application Serial No. 42 34 294, the rolling elements 20 can be installed for movement, in dependency upon a change of transmission ratio, in a radial direction along cooperating rolling ramps or rolling tracks.

In the described embodiment which is shown in FIG. 1, the plenum chamber 6 is connected with the torque sensor 14. However, it is also possible to apply the pressure furnished by the torque sensor 14 in the outer plenum chamber 13; the inner plenum chamber 6 then serves to change the transmission ratio. To this end, it is merely necessary to alternate or interchange the connections of the two conduits 52 and 37 at the second pair 2 of conical flanges.

In the embodiment of the torque sensor 14 which is shown in FIG. 1, its component parts are made predominantly of sheet metal. For example, especially the cam discs 18 and 19 can constitute shaped sheet metal parts made, for example, by embossing.

FIG. 2 shows one-half of a detail of a novel transmission 100 wherein only a portion of the driver gear 115, corresponding to the analogous gear of FIG. 1, is actually shown. The illustrated torque sensor 114 has essentially circular ring-shaped disc portions 118, 119, and these two parts 118, 119 are shown in the form of cam discs with ramps flanking non-illustrated rolling elements. The element 118 is connected for rotation with the driver gear 115.

The torque sensor 114 transmits to the pair 101 of conical flanges torque being introduced by the driver gear 115. The driver gear 115 is form-lockingly, such as by gear teeth 117, connected for rotation with the cam disc 118 which forms part of the torque sensor 114 and bears axially against the driver gear 115. The torque sensor 114 comprises the axially fixed cam disc 118 and an axially shiftable cam disc 119, and these discs have ramps flanking the spreading or rolling bodies.

The cam disc 119 is axially movably mounted on the input or driver shaft 199 but cannot rotate relative thereto. To this end, the cam disc 119 comprises a radially outer portion 119a which extends axially and away from the rolling elements and carries gear teeth 119b mating with complementary teeth 121a of a component part 121 which is fixedly secured to the driver shaft 199 for axial as well as angular movement therewith. The teeth 119b and the complementary teeth 121a mate with each other in such a way that the component parts 119 and 121 can move axially relative to one another.

The constituents of the torque sensor 114 bound two plenum chambers 122, 123. The plenum chamber 122 is bounded by a ring-shaped component part 124 rigidly connected to the driver shaft 199, as well as by a component part 125 formed by the cam disc 119. The ring-shaped component part 124 is connected with the shaft 199, namely the driver shaft, by way of a welded joint which connects the shaft to the radially inner part of the member 124. The welded joint has a welded seam 190 which can constitute a ring-shaped seam and connects the ring-shaped part 124 with the shaft 199 against angular movement relative thereto and further serves as an axial abutment therefor.

The connection of the component part 124 with the shaft 199 for the set of conical flanges exhibits the advantage that it is not necessary to resort to a nut and to gear teeth in order to establish a rather expensive connection capable of preventing relative rotation as well as of taking up axial forces. By resorting to a welded seam which can resist rotation and can take up axial forces, one can obtain a relatively simple connection which simultaneously acts as a seal and renders it possible to achieve savings in space. This can be seen in the detail which is illustrated in FIG. 2a. The welded seam can take up axial forces or pressure exerted by the component parts of the piston-cylinder units. Moreover, by resorting to a welded seam, one achieves that the component parts are secured against unintentional rotation.

FIG. 2 shows by way of example the manner of sealing plenum chambers by means of a welded seam. For example, the pressure $p_1$ in the space 122 matches the pressure $p_4$ in the space between the conical flange 101a and the component part 124. A seal between the pressure $p_4$ and the pressure $p_3$ in the space 123 is established by a sealing ring 150, such as for example and O-ring or a press fit, in the radially inner region between the component part 124 and the shaft 199. The O-ring 150 is received in a circumferential groove in the peripheral surface of the shaft 199. A seal between the pressure $p_3$ and the pressure $p_2$ is established for example by way of an O-ring or a press fit. The welded seam 190 seals between the regions which are maintained at the pressures $p_1$ and $p_2$.

Further advantages of the welded seam, in addition to its ability to prevent rotation, to take up axial forces and/or to act as a seal, are small space requirements and its non-separability.

As can be seen in FIG. 2a, the welded seam 190 can be overlapped by a cover cap 195 which can be pushed onto the shaft in the form of a circular ring-shaped washer and covers the welded seam. The cover cap 195 includes a radially inner first annular portion 195a which extends in the axial direction and defines an opening for the shaft. Furthermore, the cover cap 195 comprises a radially outer second annular portion 195b which extends in the axial direction and axially overlies the component part 124 at selected locations or at least in part. The cover cap 195, which can be pressed onto the shaft for the set of conical flanges, can serve to possibly reduce the likelihood of contamination of hydraulic oil in the transmission.

Figure 3:
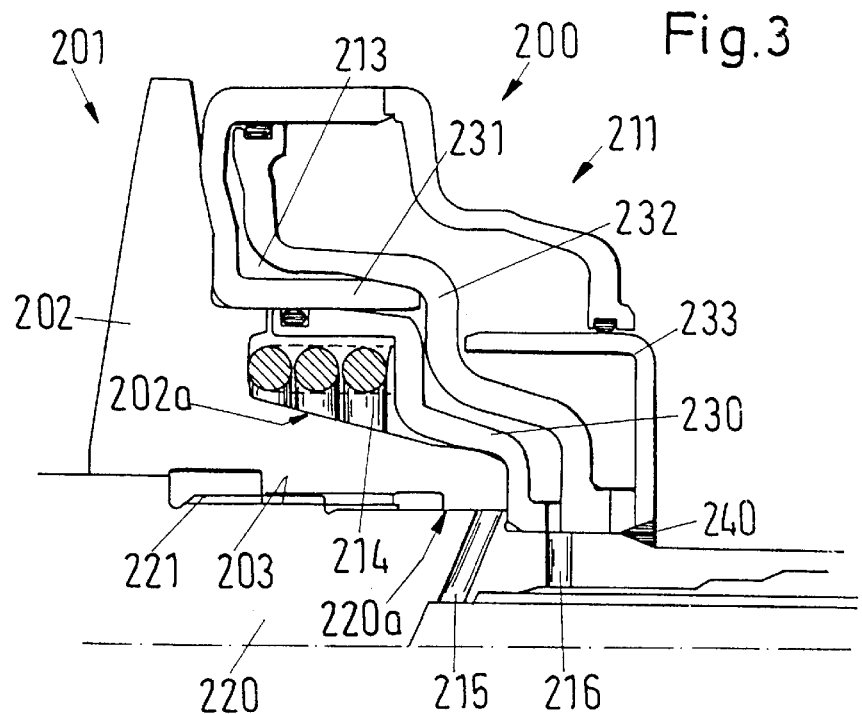

FIG. 3 illustrates a portion of a conical flange transmission 200 with a pair 201 of conical flanges including an axially movable conical flange 202 and a conical flange, not shown in FIG. 3, which is axially fixedly connected with a shaft 220. The axially movable conical flange 202 is axially movably mounted on a shaft 220 but is non-rotatably coupled therewith. To this end, the conical flange 202 comprises internal gear teeth 203 meshing with external gear teeth 221 of the shaft 220 in a form-locking rotation preventing manner.

In order to axially shift the axially displaceable conical flange 202 and to regulate the pressing engagement with a wrapping or training means between the conical flanges of a pair of conical flanges as well as for selection of the ratio of the transmission, there is provided a piston/cylinder unit 211 which comprises two plenum chambers 213, 214 for the application of pressure. These plenum chambers 213, 214 are supplied with a pressure medium by way of channels 215, 216 in the shaft 220, there being further provided, if necessary, suitable valves, flow restrictors and at least one pump to supply pressurized fluid.

The plenum chambers 213, 214 are defined by essentially ring-shaped structural members. The plenum chamber 214 is formed by the radially inner portion of one sidewall 202a of the axially movable conical flange 202, by the cylindrical peripheral wall 220a of the shaft 220, by a radially inner wall of the circular ring-shaped component part 230, as well as by a radially inner wall which forms part of the structural member 231 and extends in the axial direction. This plenum chamber 214 is essentially rotationally symmetrical with reference to the axis of the shaft 220. The capacity or volume of the plenum chamber 214 is variable due to axial displaceability of the conical flange and the fact that the component part 230 is axially fixed so that, by properly planning the pressure of fluid in this plenum chamber, one can regulate the axial displacement of the conical flange. This expedient can also be resorted to in order to regulate the pressure upon the wrapping means. On the one hand, the circular ring-shaped component part 230 is axially fixed in one direction by an external shoulder of the shaft 220 and, on the other hand, is axially fixed in the other direction by the circular ring-shaped structural member 232. The radially inner portion of the circular ring-shaped component part 232 is connected with the shaft by means of a welded seam 240. The welded seam 240 establishes a rotation-preventing connection between the element 232 and the shaft 220 and also serves to take up axial forces between them.

The circular ring-shaped component part 232 is further connected with an additional circular ring-shaped component part 233 by the welded seam 240, which connects the radially inner portion of the component part 233 to the shaft 220, or by a further welded seam. In accordance with a further advantageous modification, the radially inner portion of the element 230 can be welded to the shaft 220.

It will be seen that the axially displaceable conical flange 202 and the circular ring-shaped element 231 which is axially fixedly connected thereto jointly form the piston of the piston/cylinder unit 211, the cylinder being formed by the elements 220, 230. In the plenum chamber 214, there is provided an energy storing device which, in a manner analogous to that already described with reference to FIG. 1, operates between the conical flange 202 and the axially fixedly mounted element 230.

The plenum chamber 213 is defined by a ring-shaped component part 231 having a substantially c-shaped cross-sectional outline, by the radially outer wall of the circular ring-shaped component part 230, and by the radially inner wall of the component part 232. This plenum chamber 213 is essentially rotationally symmetrical with reference to the axis of the shaft 220. The volume or capacity of the plenum chamber 213 is variable because the conical flange is movable axially together with the component part 231 which is fixedly connected to the flange for axial movement therewith, and because the component part 232 is held against axial movement; thus, a planning of the selection of fluid pressure in the plenum chamber 213 entails a controlled axial displacement of the conical flange. Furthermore, such mode of operation renders it possible to regulate the biasing of the conical flange against the wrapping means. The radially inner portion of the circular ring-shaped part 232 is secured to the shaft by the welded seam 240.

The radially outer end portions of the circular ring-shaped component parts 230 and 232 are provided with receptacles for sealing rings which sealingly engage the cylindrical surfaces of the element 231.

Figure 4:
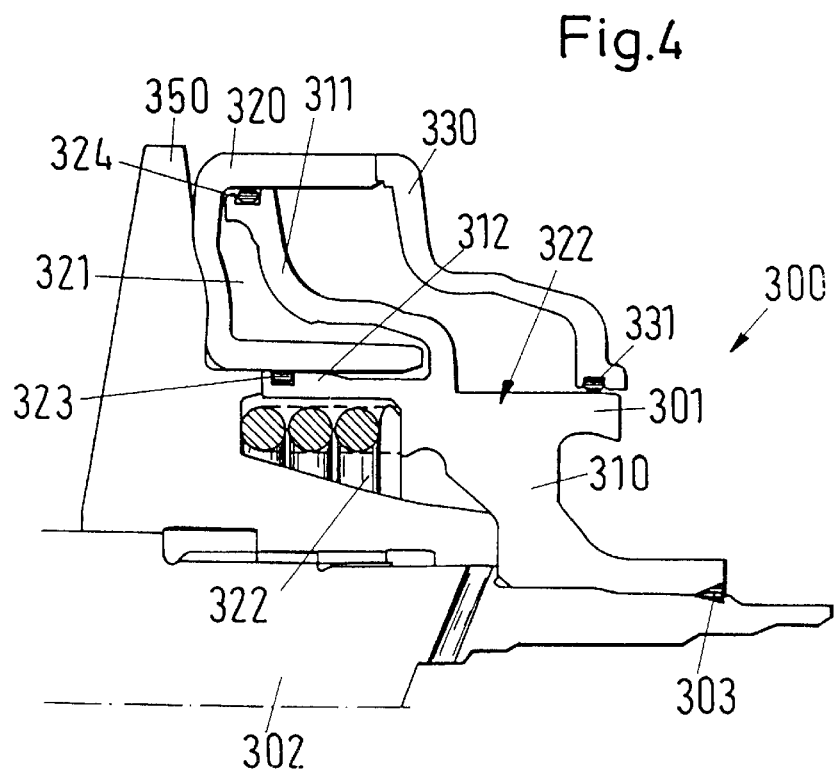

FIG. 4 shows a further modification 300 wherein the circular ring-shaped component parts 230, 232 and 233 are functionally united into a complex circular ring-shaped component part 301. The radially inner portion of this component part 301 is connected to the shaft 302 by a welded seam. The complex circular cylindrical component part 301 comprises an essentially circular cylindrical core 310 as well as arms 311, 312 which constitute circular ring-shaped disc portions. The arm 311 extends in the radial direction as well as in the axial direction, whereas the orientation of the arm 312 is essentially exclusively in the axial direction. The end portions of the arms 311, 312 are provided with receptacles for sealing rings. Such sealing rings 323, 324 are urged against complementary sealing surfaces of the c-shaped component part 320 to seal the plenum chambers 321, 322. It is of advantage if the rotationally symmetrical component part 301 constitutes a forging or a casting. It is desirable that the arms 311, 312, too, be made of sheet metal, e.g., they can constitute stampings and can be bonded to the element 310, e.g., by welding. This is of particular advantage in that embodiment wherein the arms constitute ring-shaped sheet metal parts. Such arms, together with the ring-shaped core of the element 310, can be welded to the peripheral portion of the shaft 302.

The radially outer arm of the circular ring-shaped component part 320 having a c-shaped cross-sectional outline is sealingly connected with a circular ring-shaped component part 330 which serves as a bonnet or hood acting to intercept oil, which seeks to escape under the action of centrifugal force, and to guide the intercepted hydraulic medium, such as oil, radially inwardly. The hood which counteracts centrifugal force has a radially inner portion with a receptacle for confinement of a sealing ring 331 which is sealingly urged against the external peripheral surface 332 of the component part 301.

The component part 301 is fixed in the axial direction and the component part 320 is non-rotatably connected with and is held against axial movement relative to the conical flange 350 so that the parts 301 and 350 are movable axially as a unit.

Figure 5:
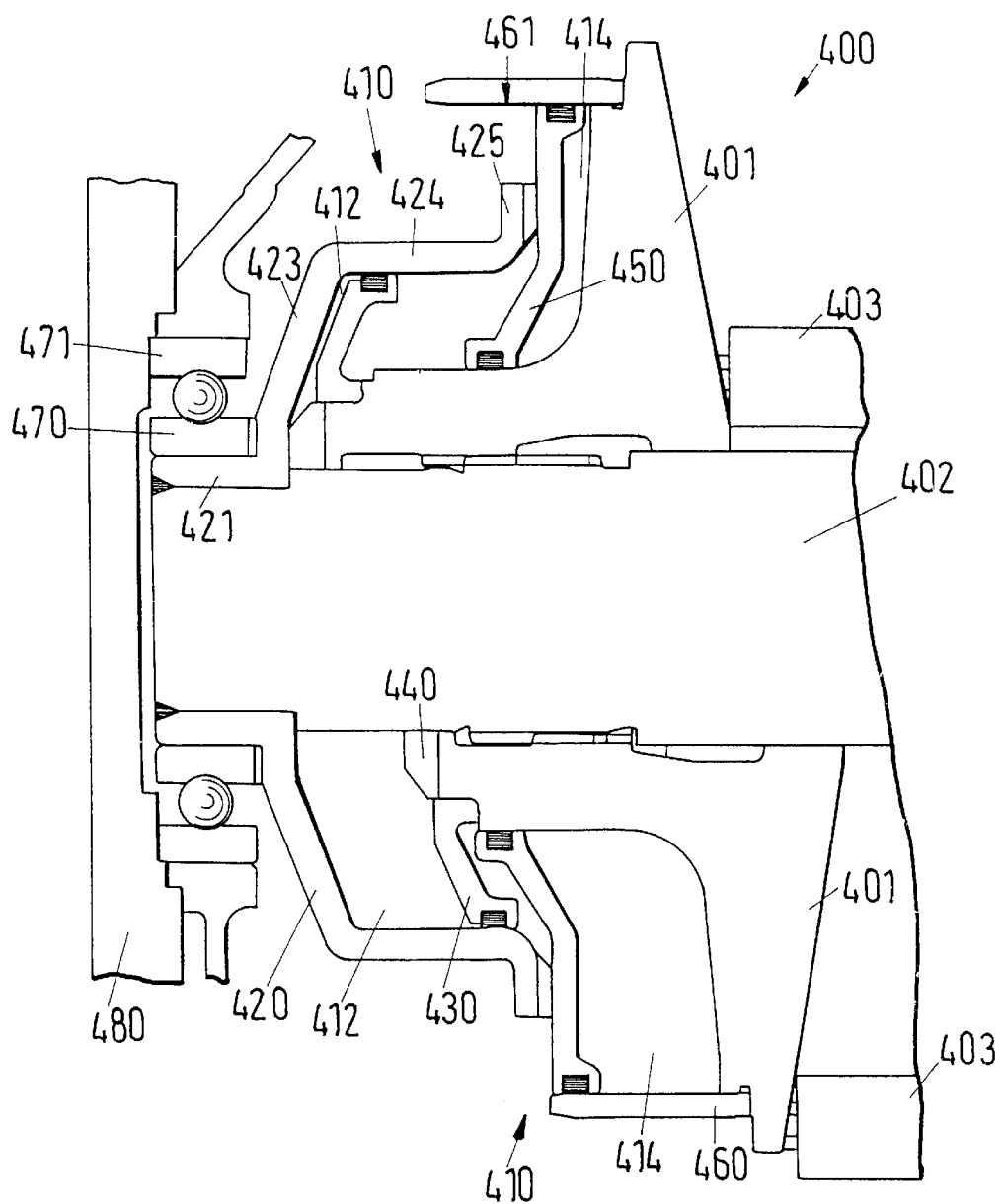

FIG. 5 illustrates a portion of a transmission 400 having an axially shiftable conical flange 401 which is shown in a sectional view. The axially shiftable conical flange 401 is axially movably but non-rotatably mounted on the shaft 402. The non-rotatable connection comprises an internal gear in the conical flange 401 and a mating external gear on the shaft 402. Only a portion of the wrapping means 403 is shown.

The upper half of FIG. 5 shows the conical flange 401 in a first axial position, and the lower half of this Figure shows the conical flange in a second axial position, each of these positions corresponding to a different ratio of the transmission.

In order to move the axially movable conical flange axially, there is provided a piston-cylinder unit 410 with two plenum chambers 412, 414 for reception of pressurized fluid.

The plenum chamber 412 is defined and bounded by the circular ring-shaped element 420, the shaft 402, the conical flange 401 and the piston 430. This plenum chamber communicates with a conduit 440 adapted to receive pressurized fluid by way of a non-illustrated connection along the shaft 402.

The radially inner portion 421 of the circular ring-shaped element 420 is non-rotatably connected with the shaft 402, such as by welding. The radial extension of the element 420 increases within a first axial intermediate zone 423 and remains constant within a second intermediate range 424. In the axial end range 425, which is adjacent the conical flange, the element 420 serves as an abutment for the piston 450.

The piston 430 constitutes a circular ring-shaped element and its radially inner portion is non-rotatably and axially fixedly connected with the axially displaceable conical flange 401, e.g., by welding or in a frictional or form-locking manner. The radially outer end of the piston 430 is provided with a seal, such as a ring received in an external annular groove and being urged radially outwardly to sealingly engage the portion 424.

The plenum chamber 414 is defined and bounded by the circular ring-shaped element 460, the conical flange 401 and the piston 450. This plenum chamber communicates with a conduit (not shown) which can receive pressurized fluid along the shaft 402 by way of a further conduit or connection (also not shown).

Basically, the circular ring-shaped element 460 constitutes a hollow cylinder and is connected to the radially outer portion of the axially displaceable conical flange 401, e.g., by way of a form-locking or frictional connection. It is also possible to provide a welded joint.

The piston 450 constitutes a circular ring-shaped element. The radially inner and radially outer ends of the piston 450 carry seals each including a sealing ring received in a groove and being urged to sealingly engage the region 461 and the peripheral wall 401a.

The radially inner portion of the circular ring-shaped element which defines a plenum chamber simultaneously serves to receive the inner race 470 of a bearing which serves to journal the shaft 402 in the housing 480. The outer race 471 of the bearing is installed in the housing 480.

Figure 6:
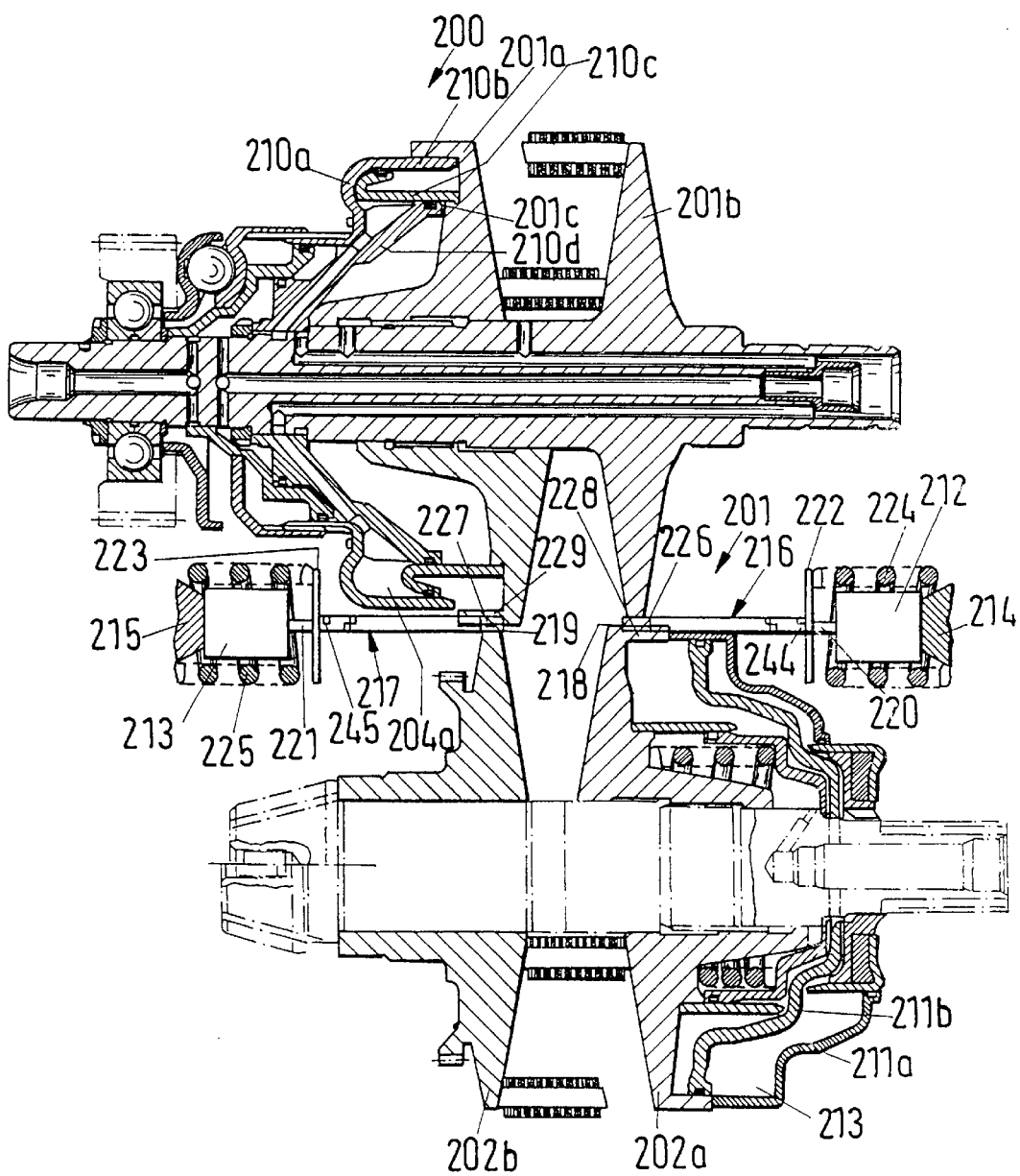

FIG. 6 shows a conical flange transmission 200 which is similar to the already fully described transmission 10 shown in FIG. 1. One of the differences is that the transmission 200 comprises a locking or blocking device 201 which is designed for cooperation with the driven and driving conical flanges 201a, 201b, 202a, 202b. In a less expensive embodiment, the locking device can be designed to act upon one of the conical flange sets 201a, 202b or 202a, 201b; in such instance, the locking device preferably acts upon the set of conical flanges 201a, 202b in order to save space and to simplify the assembly.

The locking device 201 comprises actuators 212, 213 which are fixedly mounted on housing cams 214, 215 or for pivotal movement. It is preferred to employ electrically operated actuators such as electromagnets or motors with an arrangement for conversion of rotary movement into a linear movement, for example, a worm gearing with a push rod or piston rod 220, 221 and a disc 222, 223 adapted to move the respective linkage 216, 217 axially in either direction. Axially between the housing cams 214, 215 and the discs 222, 223 there are respectively provided discrete axially operating energy storing devices—here shown in the form of coil springs 224, 225—serving to establish the maximum adjusting movement of the push rods 220, 221. The actuators 212 and 213 operate against the respective energy storing devices by moving the push rods against the abutments with the shortest adjusting movement.

The mode of operation of the adjusting arrangements or linkages 216, 217, which are connected with the corresponding discs 222, 223 by the respective joints 244, 245 so that they are positively guided, can be better seen in and, therefore, will be explained in greater detail with reference to FIG. 7. The adjusting arrangements 216, 217 convert axial movements of the push rods 220, 221 into pivotal movements with the result that the wedges 218, 219 are moved from the outside in the circumferential direction of the conical flanges 201a, 201b, 202a, 202b into clearances or gaps 226, 227 between such flanges.

In order to avoid the development of tilting moments while the respective conical flanges 201a, 202b and 201b, 202a are axially spaced apart from each other, the conical flanges 201a and 202a are respectively provided with axially extending collars 228, 229 so that the two sets of conical flanges 201a, 202b and 202a, 201b are respectively provided with axial abutment surfaces for the wedges 218, 219 at the same axial level. Each of the collars 228, 229 constitutes a cylindrical abutment extending in the axial direction and influencing the configuration of the piston spaces or covers therefor. Thus, in the illustrated embodiment the piston space is defined in part by the collar 228 and the cylinder 211a, these parts being sealingly connected to each other, for example by welding, which renders it possible to achieve a pronounced simplification of the cylinder 211a for the piston 211b. The collar 229 of the conical flange 201a serves to center the sheet metal part 210a which defines the outer piston chamber 204a and exhibits in the region 210b an axially oriented cam profile as seen in the circumferential direction while supporting it radially outwardly. In order to seal the piston chamber 204a, there is provided a sheet metal part 210c which is disposed between the piston 210d and sheet metal part 210a and is centered by abutting a shoulder 201c of the conical flange 201a.

FIG. 7 shows a locking device 201 in an elevational view with the conical flanges omitted for the sake of clarity. This locking device is designed for only one pair of conical flanges or discs including a conical disc at the driving side and a conical disc at the driven side. The solid lines and the dotted lines respectively illustrate the locking device in the disengaged and engaged positions.

The actuator 213 is secured to a housing projection 215 and comprises a push rod 221 which is adjustable through the actuator 213 in both axial directions as indicated by the arrows. The end portion 223 of the push rod 221 is shaped to constitute a dish. A coil spring 225 is stressed axially between the dish 223 and the housing projection 215 to apply to the push rod 221 an axially oriented force. Thus, when the locking device 201 is engaged, the coil spring assists the actuator 213 or, in response to proper selection of the characteristic of the spring 225, the latter disengages the locking device 201 without assistance from the actuator 213. To this end, the actuator 213 can be designed in such a way that, once the locking device 201 is disengaged, the push rod 221 is locked, i.e., the actuator need not be activated at all times. In order to render the locking device operative, it is then merely necessary to furnish an impulse to release the locking device.

The dish 223 is adjacent and connected to a joint 245 which supports the adjusting linkage 217 including two levers or links 246, 247 turnably carried by the joint 245. The links 246, 247 are rotatably connected with two additional levers or links 250, 251 by way of joints 248, 249. The levers 250, 251 are articulately connected to pivot points 252, 253 which are carried or defined by the transmission case or by another stationary part of the transmission. The ends of the levers 250, 251 carry the wedges 219a, 219b in such a way that the wedges extend away from the pivot points 252, 253 as seen in the longitudinal directions of the respective levers 250, 251. Basically, a single wedge could suffice to ensure a proper fixing operation; the described adjusting linkage 217 can remain unchanged except that, beyond one of the pivot points 252, 253, the length of the respective lever 250 or 251 can be reduced.

The adjusting linkage serves to convert an axially oriented movement of the actuator into a rotary movement about the pivot points 252, 253 to move the wedges in a circumferential direction into the clearances or gaps between two conical flanges, namely one at the input or driving side and the other at the output or driven side.

In the event of failure of the source of electrical energy for the actuator 213, one can resort to an auxiliary voltage source for the actuator or a manually operable emergency unlocking arrangement 254 which will be described below. Such arrangement also comprises a toggle joint with a first lever 255 which is rotatably connected to the joint 245, and a second lever 247 connected to a portion 256 of the housing. The two levers 255, 257 can turn jointly by way of an articulated joint 258. During engaging operations, the toggle lever buckles at the joint 258 so that, when the locking device assumes its end position or engaged condition, the levers 255, 257 assume the positions which are shown in FIG. 7 by broken lines. The joint 258 is fixedly connected with a pull-type cable 259 which extends outwardly from the transmission case 260 and is provided with a handgrip portion 262. A distance compensating spring 261, which is installed between the handgrip portion and the exterior of the transmission case, serves to compensate for the movement of the joint 258 during engagement and disengagement of the locking device 201. Alternatively, one can dispense with the provision of a compensating spring by establishing, instead, a spare length of the pull cable 259 in the transmission. If the emergency disengaging or unlocking device 254 is to be put to use, the handgrip portion 262 is subjected to the action of a pulling force and the locking device is disengaged by way of the aforedescribed linkage or lever system. It is also conceivable to employ actuating arrangements utilizing an actuating rod or bar which is operatively connected with the joint 258 so that, depending upon the arrangement of the rod, the emergency unlocking or disengaging device can be pushed or pulled. The inventive concept further embraces guidance of the actuating device to a different location, for example, into the passenger compartment. Still further, the compensating spring 261 can be caused to act upon the joint within or externally of the transmission, and this spring can be designed and set up in such a way that, if its force is sufficient, it can automatically disengage the locking device; in such instance and when the operation is normal, the spring must be maintained in stressed condition for example by a bolt or the like and, in order to carry out an emergency unlocking operation, the bolt must be removed by hand, for example, by resorting to a cable, such as a Bowden wire, or pyrotechnically.

The patent claims which were filed with the application are formulation proposals without prejudicing the achievement of broader patent protection. The applicants reserve the right to claim additional features heretofore disclosed only in the specification and/or in the drawings.

References made in the dependent claims to preceding claims are indicative of further developments of the matter of the main claim by pointing to the features of the respective dependent claim; they are not to be interpreted as a waiver of achievement of independent substantive protection for the features of the dependent claim or claims being referred to in a further dependent claim.

In fact, the features of such dependent claims constitute or can constitute independent inventions having a status independent of the matter recited in the preceding dependent claims.

Furthermore, the invention is not limited to the embodiments which are described in the specification. On the contrary, numerous changes and modifications are possible within the framework of the invention, especially such modifications, elements and combinations and/or materials which are considered to be inventive, for example, by combination or alteration of those features and/or elements and/or method steps referred to in the general description and in the description of embodiments as well as in the claims, and which, by resorting to combinable features, lead to a new device or to novel method steps and/or series of method steps, also if they relate to manufacturing, testing and operational undertakings.

What is claimed is:

1. An infinitely variable transmission comprising a first shaft and a second shaft; a pair of driving conical flanges arranged on the first shaft and a pair of driven conical flanges arranged on the second shaft, each pair having one axially movable conical flange and one axially fixed conical flange; said transmission further comprising a locking device which when necessary can frictionally lock at least one driving conical flange to a driven conical flange.

2. The transmission according to claim 1, wherein the frictional lock occurs as a result of a frictional engagement between the locking device and respective outer peripheries of said at least one driving conical flange and said driven conical flange.

3. The transmission according to claim 2, wherein the locking device comprises at least one wedge and the frictional engagement takes place by way of the at least one wedge being inserted from a circumferential direction of the conical flanges into a gap which is provided between said outer peripheries.

4. The transmission according to claim 3, wherein the locking device comprises two wedges that are inserted into the gap in each of the two circumferential directions.

5. The transmission according to claim 3, wherein the locking device comprises at least one actuator by which the at least one wedge is introduced into the gap.

6. The transmission according to claim 3, wherein the at least one wedge has curved contact surfaces conforming to said outer peripheries.

7. The transmission according to claim 3, wherein the outer periphery of at least one conical flange is provided with an axially extending, cylindrical collar in such a way that the at least one wedge contacts said outer peripheries at locations that are axially abreast of each other.

8. The transmission according to claim 5, wherein the locking device further comprises an axially effective energy storing device that is prestressed in the direction of its effectiveness and locked in a prestressed condition.

9. The transmission according to claim 5, wherein the at least one actuator is operated electrically, hydraulically, pneumatically or mechanically.

10. The transmission according to claim 8, wherein the locking device further comprises a release mechanism by which in the course of an emergency operation the locking device can be released without assistance from the actuator.

11. The transmission according to claim 9, wherein the at least one actuator is operated by an electric motor, a hydraulic pressure cylinder, a pneumatic pressure cylinder, or a cable winch.

12. The transmission according to claim 11, wherein the at least one actuator is operated by a cable winch that is operated by an electric winch motor.

13. The transmission according to claim 10, wherein the release mechanism operates mechanically or pyrotechnically.

* * * * *